(12) United States Patent
Chang et al.

(10) Patent No.: US 10,051,434 B2
(45) Date of Patent: Aug. 14, 2018

(54) SELECTIVE CROWDSOURCING FOR MULTI-LEVEL POSITIONING

(71) Applicant: QUALCOMM Incorporated, San Diego, CA (US)

(72) Inventors: Daniel Chang, San Carlos, CA (US); Sai Pradeep Venkatraman, Santa Clara, CA (US); Saket Thukral, San Diego, CA (US)

( * ) Notice: Subject to any disclaimer, the term of this patent is extended or adjusted under 35 U.S.C. 154(b) by 0 days.

(21) Appl. No.: 15/079,492

(22) Filed: Mar. 24, 2016

(65) Prior Publication Data

US 2017/0280301 A1 Sep. 28, 2017

(51) Int. Cl.
*H04W 24/00* (2009.01)
*H04W 4/04* (2009.01)
*H04W 24/08* (2009.01)

(52) U.S. Cl.
CPC .......... *H04W 4/043* (2013.01); *H04W 24/08* (2013.01)

(58) Field of Classification Search
CPC ....... H04W 4/043; H04W 24/08; H04W 4/02; H04W 4/04; G01S 5/0242
USPC ....................................................... 455/456.5
See application file for complete search history.

(56) References Cited

U.S. PATENT DOCUMENTS

| | | | | |
|---|---|---|---|---|
| 2008/0176583 A1* | 7/2008 | Brachet | ............. | G01S 5/0236 455/456.3 |
| 2010/0130229 A1* | 5/2010 | Sridhara | ............. | G01S 19/49 455/456.1 |
| 2011/0090081 A1* | 4/2011 | Khorashadi | ............. | G01S 5/0252 340/539.13 |
| 2012/0165012 A1* | 6/2012 | Fischer | ............. | G01S 5/0242 455/435.1 |
| 2012/0182933 A1* | 7/2012 | Bandhakavi | ............. | G01S 5/0242 370/328 |
| 2012/0203453 A1* | 8/2012 | Lundquist | ............. | G01C 21/005 701/434 |
| 2012/0317370 A1* | 12/2012 | Luna | ............. | H04L 67/1095 711/146 |
| 2013/0018629 A1* | 1/2013 | Sidhu | ............. | G01C 21/165 702/150 |
| 2013/0281111 A1* | 10/2013 | Syrjarinne | ............. | G01S 5/0252 455/456.1 |
| 2013/0297198 A1 | 11/2013 | Vande Velde et al. | | |
| 2014/0073345 A1* | 3/2014 | Chintalapudi | ............. | G01C 21/165 455/456.1 |
| 2014/0128100 A1* | 5/2014 | Sridhara | ............. | G01S 5/0252 455/456.1 |

(Continued)

FOREIGN PATENT DOCUMENTS

| WO | WO-2013065042 A1 | 5/2013 |
|---|---|---|
| WO | WO-2013126687 A1 | 8/2013 |

OTHER PUBLICATIONS

Ye H., et al., "B-Loc: Scalable Floor Localization using Barometer on Smartphone," IEEE 11th International Conference on Mobile Ad Hoc and Sensor Systems (MASS), 2014, pp. 127-135.

(Continued)

*Primary Examiner* — Mong-Thuy Tran
(74) *Attorney, Agent, or Firm* — Thien T. Nguyen

(57) ABSTRACT

Example methods, apparatuses, and/or articles of manufacture are disclosed herein that may be utilized, in whole or in part, to facilitate and/or support one or more operations and/or techniques for selective crowdsourcing for multi-level positioning, such as positioning in a multi-level structure, for example.

18 Claims, 4 Drawing Sheets

(56) References Cited

U.S. PATENT DOCUMENTS

| | | | |
|---|---|---|---|
| 2014/0213298 A1* | 7/2014 | Marti | G01S 5/0252 |
| | | | 455/456.3 |
| 2014/0274136 A1* | 9/2014 | Edge | H04W 4/04 |
| | | | 455/456.2 |
| 2014/0323160 A1* | 10/2014 | Venkatraman | G01S 5/0236 |
| | | | 455/456.6 |
| 2014/0324381 A1 | 10/2014 | Venkatraman et al. | |
| 2014/0324590 A1* | 10/2014 | Kong | G06Q 30/0261 |
| | | | 705/14.58 |
| 2014/0335893 A1 | 11/2014 | Ronen | |
| 2014/0335900 A1* | 11/2014 | Farris | H04W 4/02 |
| | | | 455/456.3 |
| 2014/0364101 A1 | 12/2014 | Do et al. | |
| 2015/0045054 A1* | 2/2015 | Emadzadeh | H04W 4/043 |
| | | | 455/456.1 |
| 2015/0198721 A1* | 7/2015 | Waters | G01S 19/48 |
| | | | 342/357.29 |
| 2015/0373503 A1 | 12/2015 | Jovicic | |
| 2016/0066151 A1* | 3/2016 | Palanki | H04L 67/10 |
| | | | 455/456.1 |
| 2016/0088440 A1* | 3/2016 | Palanki | H04W 4/04 |
| | | | 455/456.1 |
| 2016/0265918 A1* | 9/2016 | Sen | G01S 5/0252 |
| 2016/0360380 A1* | 12/2016 | Huang | H04W 64/00 |

OTHER PUBLICATIONS

International Search Report and Written Opinion—PCT/US2017/019221—ISA/EPO—dated Jul. 3, 2017.
PCT/US2017/019221 / Application as filed Feb. 20, 2017, 55 pages.

\* cited by examiner

SELECTIVE CROWDSOURCING FOR MULTI-LEVEL POSITIONING

BACKGROUND

1. Field

The present disclosure relates generally to position or location estimations of mobile communication devices and, more particularly, to selective crowdsourcing for multi-level positioning for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in some instances, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless communications network. Acquired wireless signals may, for example, be processed by or at a mobile communication device, and its location may be estimated using known techniques, such as Advanced Forward Link Trilateration (AFLT), Observed Time Difference of Arrival (OTDOA), base station identification, or the like.

In an indoor environment, mobile communication devices may be unable to reliably receive or acquire satellite or like wireless signals to facilitate and/or support one or more position estimation techniques. For example, signals from an SPS or other wireless transmitters may be attenuated or otherwise affected in some manner (e.g., insufficient, weak, fragmentary, etc.), which may at least partially preclude their use for position estimations. At times, a mobile communication device may obtain a position fix by measuring ranges to three or more terrestrial wireless transmitter devices, such as access points, for example, positioned at known locations. Ranges may be measured, for example, by obtaining a Media Access Control identifier (MAC ID) address from wireless signals received from suitable access points and measuring one or more characteristics of received signals, such as signal strength, round trip delay, or the like. In some instances, an indoor location of a mobile communication device may be estimated via radio heat map signature matching, for example, in which current characteristics of wireless signals, such as signal strength, round trip delay, or the like received from access points at the device are compared with expected or previously measured signal characteristics stored as heat map values in a database.

At times, applicable data, such as to facilitate and/or support location estimates of mobile communication devices via radio heat map signature matching, OTDOA, triangulation, etc. may be collected using one or more crowdsourcing approaches. Crowdsourced data may, for example, be accumulated and/or stored in a suitable database, which may be associated with a location-based service (LBS), wireless communications service provider, or some other entity. A database may comprise, for example, locations (e.g., latitude, longitude, etc. coordinates, etc.), identifies (unique identification numbers, etc.), etc. of wireless transmitters, expected characteristics of wireless signals for a particular area, or the like. Crowdsourced data may, for example, be provided to mobile communication devices in positioning assistance messages to help or assist with localization. In some instances, however, a crowdsourcing process may involve continual and/or indiscriminate collection and/or reporting of data that may be less than useful, such as for subsequent positioning, database updating, etc. This may also significantly tax available resources, such as bandwidth in wireless communication links, memory space, battery life, etc. of mobile communication devices, etc., may increase cellular data usage, associated costs or data charges, or the like.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
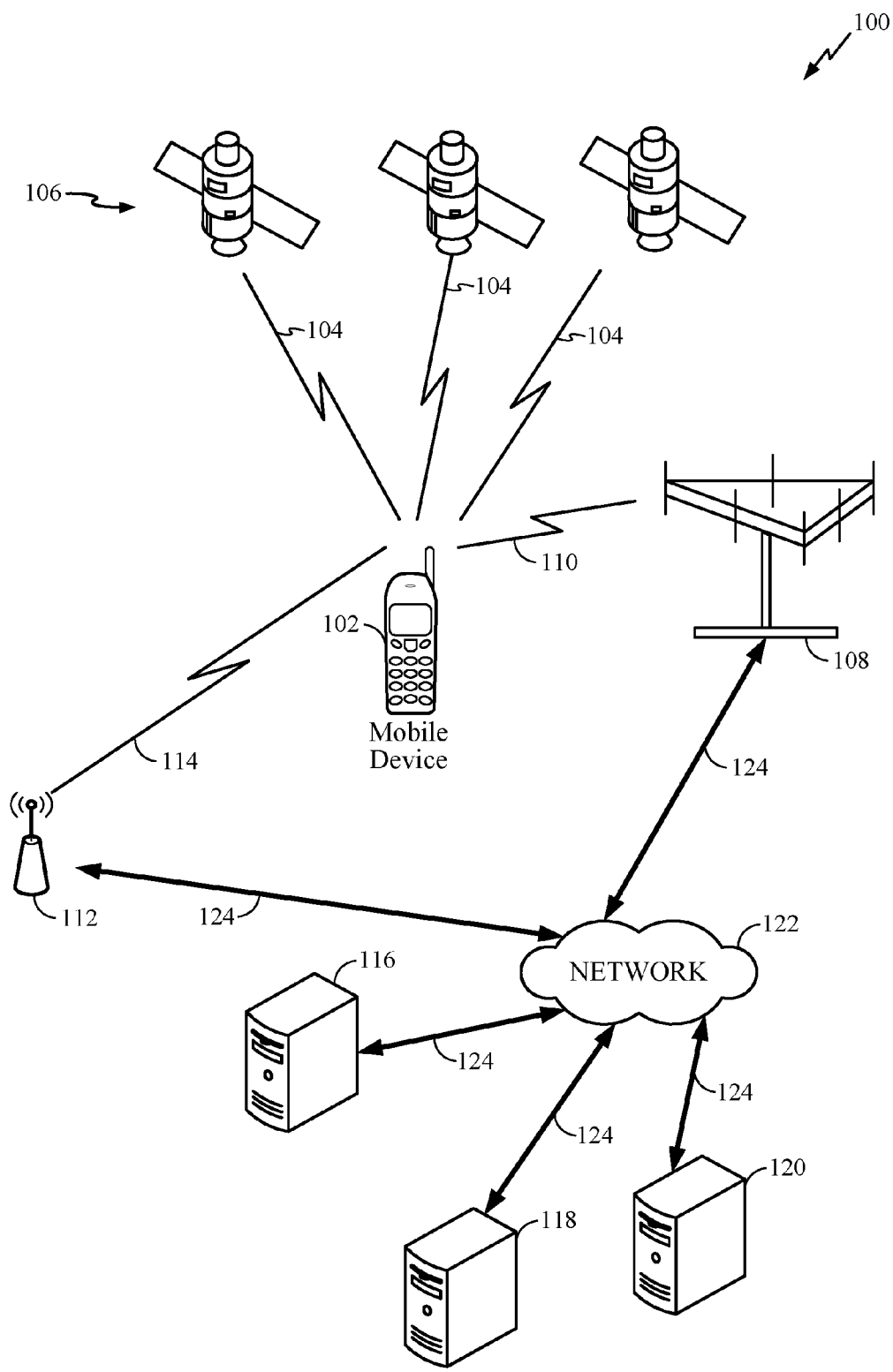
FIG. 1 is a schematic diagram illustrating features associated with an implementation of an example operating environment.

Example implementations relate to techniques for selective crowdsourcing for multi-level positioning. In one implementation, a method may comprise detecting a transition of a location of a mobile device between levels of a structure based, at least in part, on a change in an environmental condition detected via one or more sensors disposed on the mobile device; obtaining observations of wireless signals responsive to detecting the transition between the levels of the structure; and transmitting one or more messages to a server comprising the obtained observations in association with the detected transition.

In another implementation, an apparatus may comprise means for detecting a transition of a location of a mobile device between levels of a structure based, at least in part, on a change in an environmental condition detected via one or more sensors disposed on the mobile device; means for obtaining observations of wireless signals responsive to detecting the transition between the levels of the structure; and means for transmitting one or more messages to a server comprising the obtained observations in association with the detected transition.

In yet another implementation, an apparatus may comprise one or more processors coupled to a memory, the one or more processors and the memory configured to detect a transition of a location of a mobile device between levels of a structure based, at least in part, on a change in an environmental condition detected via one or more sensors disposed on the mobile device; and a wireless transceiver to communicate with an electronic communications network to obtain observations of wireless signals responsive to detecting the transition between the levels of the structure; and transmit one or more messages to a server comprising the obtained observations in association with the detected transition. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate and/or support one or more operations and/or techniques for selective crowdsourcing for multi-level positioning, such as positioning in a multi-level structure, for example. As used herein, "structure" refers to one or more natural and/or man-made physical constructs and/or arrangements of object(s), knowledge of which may be of use to a user of a mobile communication device. For example, a structure may comprise all or part of a building, knowledge of which may be useful to a user of a mobile communication device for purposes of positioning within such a building. Some example structures may comprise, for example, a mixture of indoor and outdoor environments. As discussed below, in some instances, crowdsourced data may include, for example, observations of wireless transmitters, such as access points (e.g., IEEE 802.11 std. wireless local area network (WLAN) access points, etc.), base station transceivers, radio beacons, or the like located within a building with multiple floors (e.g., a multi-story shopping mall, parking garage, etc.). In this context, "observation" refers to a measured attribute and/or characteristic of a wireless signal transmitted by a wireless transmitter and acquired by an observing receiver at a mobile device. One or more attributes and/or characteristics of a wireless signal may, for example be measured in connection with a performing a scan of an area of interest, such as a passive scan and/or active scan, or any combination thereof. As a way of illustration, an active scan may, for example, be performed via transmitting one or more requests, such as in the form of one or more unicast packets and receiving one or more responses from one or more proximate wireless transmitters, and a passive scan may, for example, be performed by "listening" for or discovering wireless signals broadcasted by proximate wireless transmitters. Passive and active scans are generally known and need not be described here in greater detail. As will also be seen, an observation may include, for example, identifiers of wireless transmitters, such as cellular identifications (Cell IDs), basic service set identifications (BSS IDs), service set identifications (SS IDs), etc., characteristics of wireless signals (e.g., received signal strength, round trip time, time of arrival, angle of arrival, transmission power levels, etc.), etc. obtained from observed wireless signals.

As also discussed below, at times, one or more observations may, for example, be obtained, at least in part, in response to a detection of a transition between one or more levels of a multi-level structure, such as one or more floors of a multi-story building, just to illustrate one possible implementation. In some instances, a transition may, for example, be detected based, at least in part, on a change in an environmental condition sensed or detected via one or more sensors disposed on a crowdsourcing mobile communication device. As used herein, "mobile device," "mobile communication device," "crowdsourcing mobile device," "location-aware mobile device," "observing mobile device," or like terms may be used interchangeably and refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations and/or techniques for selective crowdsourcing for multi-level positioning, and that claimed subject matter is not limited in this regard. It should also be noted that the terms "position" and "location" may be used interchangeably herein.

As was indicated, a position fix of a mobile device located in an indoor or like environment, multi-level or otherwise, may, for example, be obtained based, at least in part, on positioning assistance data that may be provided to the mobile device, such as by an indoor navigation system, location or positioning assistance server, or the like. In some instances, positioning assistance data may comprise, for example, one or more radio heat maps constructed for an indoor or like environment. A radio heat map may, for example, be provided in the form of radio heat map values or like metadata representing observed characteristics of wireless signals or so-called signal "signatures" indicative of expected signal strength (e.g., RSSI, etc.), round-trip delay times (e.g., RTT, etc.), or other characteristics at particular locations in an indoor or like area of interest. At times, metadata may include identities, locations, etc. of observed wireless transmitters. Thus, for a known wireless transmitter, a radio heat map may, for example, associate a particular grid point with a heat map value representative of an expected signal signature at the grid point. As such, radio heat map values associated with one or more known wireless transmitters may, for example, enable a mobile device to correlate or associate observed signal signatures with locations within an indoor or like area of interest. In some instances, positioning assistance data may include, for example, electronic digital maps for display and/or context, routing graphs for indoor or like navigation, or the like.

As alluded to previously, at times, to facilitate and/or support multi-level positioning in an area of interest, it may be useful to develop a relatively comprehensive or otherwise sufficient database of associated wireless transmitters, such as base station transceivers, radio beacons, access points, or the like. In some instances, a dedicated survey of associated radio sources may present a number of challenges, such as, for example, simulation or computation costs, time or effort involved, or the like. Thus, as was indicated, at times, one or more crowdsourcing operations and/or techniques may, for example, be employed, at least in part. In this context, "crowdsource," "crowdsourcing" or like terms refer to a process of measuring, collecting, generating, communicating, etc. applicable data by one or more agents, clients, and/or users, such as via co-located mobile devices, for example, while traveling within an area of interest. The terms "agent," "user," or "client" may be used interchangeably herein and refer to a person, device, and/or application that may facilitate and/or support one or more crowdsourcing operations and/or techniques. For example, at times, agents, clients, and/or users of mobile devices may execute desired tasks (e.g., collect observations of wireless transmitters, communicate position fixes, etc.) and be rewarded in some manner for doing so. Optionally or alternatively, crowdsourced data may, for example, be extracted (e.g., by a server, LBS, etc.), upon authorization, from a location-aware unit, memory, buffer, etc. of a crowdsourcing mobile device, for example.

At times, continually or indiscriminately crowdsourcing data within a multi-level structure may also present challenges. For example, collecting and/or communicating data on a continual basis, such as at or upon entering a multi-story building and/or while traveling within the building may be time-consuming, waste network bandwidth and/or memory of a mobile device, lead to increased processing times, affect power consumption of a mobile device, or the like. In addition, some of crowdsourced data for a multi-level structure may be quite voluminous and/or comprehensive, for example, but may be less than useful (or not at all useful), such as for subsequent positioning, updating an applicable database for an area (e.g., a radio heat map, etc.), or the like. Also, in some instances, there may be uncertainty as to a particular level (e.g., a floor of a shopping mall, etc.) on which a mobile device is located. At times, to resolve this uncertainty, a mobile device may, for example, access and/or download multiple radio heat maps, digital maps, or like data, such as for each candidate level. Again, this may waste network-related bandwidth, affect processing and/or memory resources, coverage or metadata transfer plan, or the like. Thus, at times, it may be useful to narrow down or determine a particular level (e.g., a floor, etc.) of where a mobile device may be located. A mobile device may then be provided with smaller, localized positioning assistance data, such as for use on that particular level (e.g., a portion of a heat map, locations of wireless transmitters on a particular floor, a local digital map, etc.).

In some instances, a mobile device may resolve its location as being on a particular level of a multi-level structure, such as a particular floor of a building, for example, by observing signals from one or more wireless transmitters, such as via acquiring a MAC address and/or other suitable data modulating a signal transmitted by a wireless transmitter located within an acquisition range of the mobile device. With acquisition of signals transmitted by a sufficient number of wireless transmitters, a mobile device may, for example, determine that its location is on a particular level of a multi-level structure. Here, a mobile device may, for example, compare signatures of currently observed wireless signals with expected signature values in a radio heat map provided to the mobile device as positioning assistance data, as was indicated. A mobile device may also compare currently observed MAC addresses with MAC addresses that are expected to be observable from locations on a particular level of a structure, for example, and may determine whether it is likely to be located on that level. As was indicated, having resolved its location, a mobile device may then request and/or be provided with a smaller-sized subset of positioning assistance data applicable to that particular area, such as via communications with a suitable server, for example.

In some instances, however, resolving a location by observing wireless signals and associating the observed signals with a particular level of a multi-level structure may present another challenge. For example, as was indicated, requisite wireless signals from wireless transmitters may be attenuated or otherwise affected in some manner, such as insufficient, weak, fragmentary, unsupported, etc., so as to preclude their use in location resolution. To illustrate, structural elements of some interior areas (e.g., floors, walls, windows, dividers, etc.) may be relatively dense and, as such, may be prone to multipath or fading effects, for example, which may preclude a mobile device from receiving and/or processing requisite wireless signals. In addition, emitted wireless signals may oscillate and/or propagate between adjacent levels (e.g., floors of a building, etc.) and, as such, may be acquired by a mobile device on any one of multiple levels. Again, this may, for example, make correlating and/or associating observed wireless signals with a particular level within a multi-level structure challenging.

Thus, in some instances, to resolve a particular level of a multi-level structure, such as a particular building floor on which a mobile device is located, for example, instead of or in addition to observing wireless signals, it may be useful to monitor one or more changes in a condition of an associated environment. For example, at times, a mobile device may monitor changes in altitude and/or barometric pressure, such as using an on-board barometric pressure sensor. Barometric pressure measurements may, for example, be converted to altitude, such as using any suitable approach or technique. Altitude may be subsequently correlated with a particular level of a multi-level structure, such as by utilizing a linear characteristic curve describing a functional correlation between detected pressure changes and known changes in height, as one possible example. In practice, however, computing a true altitude of a mobile device from barometric pressure measurements may require continuous or constant calibration of a sensor for weather and/or instrument drift, which, at times, may not be attainable due, at least in part, to deviations in local air temperature, density, pressure, and/or moisture content, as well as drift inherent in barometric pressure sensors, or the like. Also, unless a reference pressure is provided to a mobile device by some external source, for example, at times, the mobile device may not be able to use barometric pressure measurements to determine its true altitude. Accordingly, it may be desirable to develop one or more methods, systems, and/or apparatuses that may implement more robust multi-level positioning, such as via combining or correlating crowdsourced data with environmental changes detectable by a mobile device, for example, so as to facilitate and/or support more accurate level determination within a multi-level structure, such as a particular floor of a building.

Thus, as will be described in greater detail below, in an implementation, a change in an environmental condition associated with a mobile device may, for example, be monitored and/or detected, such as via one or more sensors disposed on a mobile device. Based, at least in part, on a detected change, a transition between one or more levels of a multi-level structure may, for example, be detected or inferred. In response to a detection of a transition, one or more crowdsourcing operations and/or techniques may, for example, be implemented. For example, as will also be seen, one or more crowdsourcing operations and/or techniques may include obtaining one or more observations of wireless signals, associating one or more observations of wireless signals with a detected transition (e.g., in a message, etc.), transmitting one or more obtained observations in association with a detected transition to a suitable server, processing and/or batching crowdsourced measurements prior to a detected transition and/or transmission to a server, or the like.

In turn, based, at least in part, on crowdsourced data, a model of virtual levels or so-called "virtual stack" corresponding to a particular physical multi-level structure may, for example, be constructed. A virtual stack may be subsequently used, at least in part, as positioning assistance data, such as, for example, to help in determining a vertical relationship of a mobile device's user to a party of interest (e.g., a first responder, etc.) in a multi-level structure without precise floor determination. Positioning assistance data may also be used, at least in part, for associating a virtual level of a stack with a particular physical level of a corresponding multi-level structure. In addition, by selectively (e.g., rather than indiscriminately, continually, etc.) crowdsourcing data, improved efficiency crowdsourcing in a multi-level structure may, for example, be achieved. For example, selective crowdsourcing may help in more effectively and/or more efficiently constructing and/or updating a database of wireless transmitters (e.g., a radio heat map, etc.) for an area of interest, such as by selecting data that may be more useful for positioning. Selective crowdsourcing may also provide a better crowdsourcing user experience, such as by not wasting battery life, memory space, etc. of a mobile device, or the like.

FIG. 1 is a schematic diagram illustrating features associated with an implementation of an example operating environment 100 capable of facilitating and/or supporting one or more processes and/or operations for selective crowdsourcing for multi-level positioning, such as via a location-aware mobile device 102 co-located with a user, for example. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations and/or techniques described herein may be performed, at least in part, in an indoor-like environment, which may include partially or substantially enclosed areas, such as urban canyons, amphitheaters, parking garages, towers, or the like. At times, one or more operations and/or techniques described herein may, for example, be performed, at least in part, in an outdoor environment.

As illustrated, in an implementation, mobile device 102 may, for example, receive or acquire satellite positioning system (SPS) signals 104 from SPS satellites 106. In some instances, SPS satellites 106 may be from a single global navigation satellite system (GNSS), such as the GPS or Galileo satellite systems, for example. In other instances, SPS satellites 106 may be from multiple GNSS such as, but not limited to, GPS, Galileo, Glonass, or Beidou (Compass) satellite systems. In certain implementations, SPS satellites 106 may be from any one several regional navigation satellite systems (RNSS) such as, for example, WAAS, EGNOS, QZSS, just to name a few examples.

At times, mobile device 102 may, for example, transmit wireless signals to, or receive wireless signals from, a suitable wireless communication network. In one example, mobile device 102 may communicate with a cellular communication network, such as by transmitting wireless signals to, or receiving wireless signals from, a base station transceiver 108 over a wireless communication link 110, for example. Similarly, mobile device 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, or the like, depending on an implementation. In some instances local transceiver 112 may comprise, for example, a wireless transmitter and/or receiver capable of transmitting and/or receiving wireless signals.

In a particular implementation, local transceiver 112 may be capable of communicating with mobile device 102 at a shorter range over wireless communication link 114 than at a range established via base station transceiver 108 over wireless communication link 110. For example, local transceiver 112 may be positioned in an indoor or like environment and may provide access to a wireless local area network (WLAN, e.g., IEEE Std. 802.11 network, etc.) or wireless personal area network (WPAN, e.g., Bluetooth® network, etc.). As was indicated, at times, an indoor or like environment associated with local transceiver 112 may comprise, for example, a multi-level structure, such as a building having a plurality of floors, for example, or the like. In an implementation, local transceiver 112 may comprise a femtocell capable of facilitating communication via link 114 according to an applicable cellular or like wireless communication protocol. Of course, it should be understood that these are merely examples of devices that may communicate with mobile device 102 over a wireless link, and claimed subject matter is not limited in this respect. For example, in some instances, operating environment 100 may include a larger number of base station transceivers 108, local transceivers 112, etc., or the like.

In an implementation, base station transceiver 108, local transceiver 112, etc. may communicate with servers 116, 118, or 120 over a network 122 via one or more links 124. Network 122 may comprise, for example, any combination of wired and/or wireless communication links and/or networks. In a particular implementation, network 122 may comprise, for example, Internet Protocol (IP)-type infrastructure capable of facilitating and/or supporting communication between mobile device 102 and one or more servers 116, 118, 120, etc. via local transceiver 112, base station transceiver 108, etc. In another implementation, network 122 may comprise, for example cellular communication network infrastructure, such as a base station controller or master switching center to facilitate and/or support mobile cellular communication with mobile device 102. As discussed below, in some instances, network 122 may facilitate and/or support one or more message exchanges, which may comprise one or more observations of wireless signals, such as at least partially obtained in association with a detected transition of mobile device 102.

Servers 116, 118, and/or 120 may comprise any suitable servers or combination thereof capable of facilitating and/or supporting one or more operations and/or techniques discussed herein. For example, servers 116, 118, and/or 120 may comprise one or more positioning assistance servers, navigation servers, map servers, crowdsourcing servers, network-related servers, or the like. Thus, servers 116, 118, and/or 120 may facilitate and/or support one or more operations and/or processes discussed herein, such as, for example, generating a virtual stack with levels corresponding to physical levels of a multi-level structure, providing and/or confirming reliability assessment regarding wireless transmitters corresponding to a particular level, deriving and/or confirming height deltas corresponding to one or more detected transitions, correlating a virtual level in a stack with a physical level within a multi-level structure, providing positioning assistance data, or the like.

In particular implementations, and as also discussed below, mobile device 102 may have circuitry or processing resources capable of computing a position fix or estimated location of mobile device 102. For example, mobile device 102 may compute a position fix based, at least in part, on pseudorange measurements to four or more SPS satellites 106. Here, mobile device 102 may compute such pseudorange measurements based, at least in part, on pseudonoise code phase detections in signals 104 acquired from four or more SPS satellites 106. In particular implementations, mobile device 102 may receive from one or more servers 116, 118, or 120 positioning assistance data to aid in the acquisition of signals 104 transmitted by SPS satellites 106 including, for example, almanac, ephemeris data, Doppler search windows, just to name a few examples.

In some implementations, mobile device 102 may obtain a position fix by processing wireless signals received from one or more terrestrial transmitters positioned at known locations (e.g., base station transceiver 108, local transceiver 112, etc.) using any one of several techniques, such as, for example, AFLT, observed time difference of arrival (OTDOA), or the like. In these techniques, a range from mobile device 102 may, for example, be measured to three or more of terrestrial transmitters based, at least in part, on one or more reference signals transmitted by these transmitters and received at mobile device 102, as was indicated. In some instances, mobile device 102 may be capable of computing a position fix based, at least in part, on requisite ranges obtained from RTT measurements of applicable message exchanges, comparing RSSI or like signal signatures observed from base station transceiver 108, local transceiver 112, etc. At times, servers 116, 118, or 120 may include, for example, a base station almanac (BSA) indicating locations, identities, orientations, etc. of cellular base stations (e.g., base station transceiver 108, local transceiver 112, etc.) in one or more particular areas or regions associated with operating environment 100.

As was indicated, in an implementation, mobile device 102 may, for example, receive positioning assistance data for one or more positioning operations from servers 116, 118, and/or 120. At times, positioning assistance data may include, for example, locations, identities, orientations, etc. of one or more local transceivers 112, base station transceivers 108, etc. for measuring ranges to these transmitters based, at least in part, on an RTT or other measurements. In some instances, positioning assistance data may include, for example, radio heat maps, context parameter maps, routeability graphs, etc., just to name a few examples. Other assistance data received by mobile device 102 may include, for example, electronic digital maps of indoor or like areas for display or to aid in navigation. A map may be provided to mobile device 102 as it enters a particular area, for example, and may show applicable features such as doors, hallways, entry ways, walls, etc., points of interest, such as bathrooms, pay phones, room names, stores, or the like. By obtaining a digital map of an indoor or like area of interest, mobile device 102 may, for example, be capable of overlaying its current location over the displayed map of the area so as to provide an associated user with additional context, frame of reference, or the like. The terms "positioning assistance data" and "navigation assistance data" may be used interchangeably herein.

In one implementation, positioning assistance data (e.g., a radio heat map, routing graph, digital map, etc.) as well as currently observed RTT, RSSI, or like measurements may assist mobile device 102 in defining feasible areas for determining propagation channels that may be subject to physical obstructions (e.g., walls, floors, ceilings, etc.). By defining these channels, mobile device 102 may apply constraints to aid in the application of filtering measurements for estimating locations or motion trajectories according to a motion model (e.g., a particle or Kalman filter), propagation model, or the like. For example, mobile device 102 may be capable of comparing RTT and RSSI levels to determine whether a particular wireless transmitter is located on a particular floor of a building. As will also be seen, in addition to measurements obtained from the acquisition of signals from one or more local transceivers 112, base station transceivers 108, etc., mobile device 102 may further apply a motion or other model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imagers, etc.) in detecting a transition of a location of mobile device 102 between one or more levels of a structure. These or like approaches will be discussed in greater detail below.

According to an implementation, mobile device 102 may access indoor navigation assistance data via servers 116, 118, and/or 120 by, for example, requesting such data through selection of a universal resource locator (URL). In particular implementations, servers 116, 118, and/or 120 may be capable of providing navigation assistance data to cover a plurality of levels within a multi-level structure, such as, for example, floors of buildings, terminals at an airport, levels at a parking garage, just to name a few examples. Also, if memory or data transmission resources at mobile device 102 make receipt of positioning assistance data for all areas served by servers 116, 118, and/or 120 impractical or infeasible, a request for such data from mobile device 102 may, for example, indicate a rough or course estimate of a location of mobile device 102. Mobile device 102 may then be provided navigation assistance data covering, for example, one or more areas including or proximate to a roughly estimated location of mobile device 102.

In one particular implementation, a request for navigation assistance data from mobile device 102 may, for example, specify a particular level within a physical multi-level structure, as will also be seen. Such a level may be subsequently associated with a virtual level of a stack constructed for that particular multi-level structure. For example, in one example server architecture, upon entry of an area, mobile device 102 may provide its known location within a multilevel structure, such as obtained via a GPS position fix prior to entering the structure, etc., such that a server may associate the provided location with a corresponding virtual stack level, and then transmit this levels to mobile device 102. Mobile device 102 may then associate a virtual level within its known location (e.g., the first floor entry, etc.) and communicate such an association to a server, which may correlate the rest of virtual levels in a stack with physical levels of a structure. Of course, claimed subject matter is not limited to this particular approach.

Even though a certain number of computing platforms or devices are illustrated herein, any number of suitable computing platforms or devices may be implemented to facilitate and/or support one or more techniques and/or processes associated with operating environment 100. For example, at times, network 122 may be coupled to one or more wired and/or wireless communication networks (e.g., WLAN, etc.) so as to enhance a coverage area for communications with mobile device 102, one or more base station transceivers 108, local transceiver 112, servers 116, 118, 120, or the like. In some instances, network 122 may facilitate and/or support femtocell-based operative regions of coverage, for example. Again, these are merely example implementations, and claimed subject matter is not limited in this regard.

Figure 2:
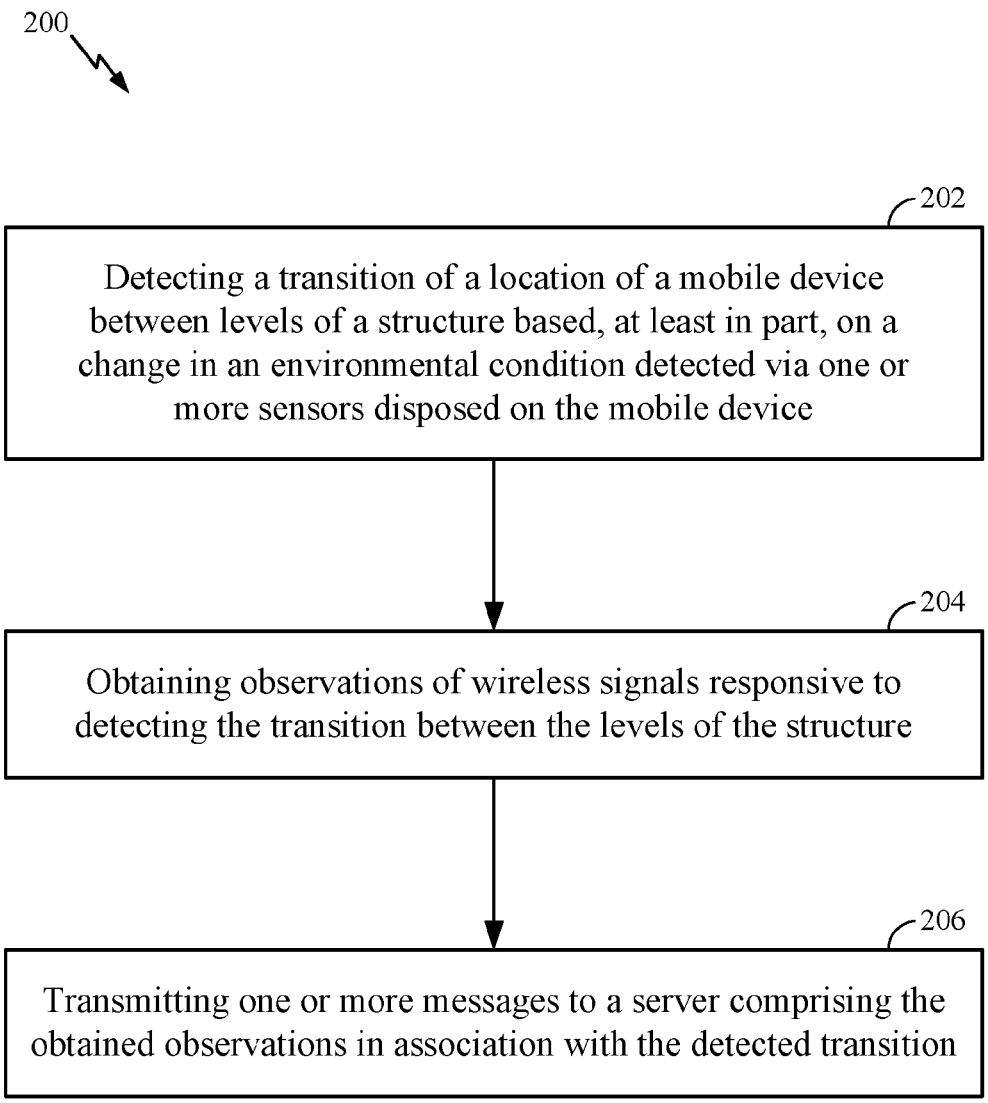
FIG. 2 is a flow diagram illustrating an implementation of an example process that may be performed to facilitate and/or support techniques for selective crowdsourcing for multi-level positioning.

With this in mind, attention is now drawn to FIG. 2, which is a flow diagram illustrating an implementation of an example process 200 that may be performed, in whole or in part, to facilitate or support one or more operations and/or techniques for selective crowdsourcing for multi-level positioning for use in or with a location-aware mobile device, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with detecting a transition of a location of a mobile device between levels of a structure based, at least in part, on a change in an environmental condition detected via one or more sensors disposed on the mobile device. As was indicated, a mobile device may comprise, for example, one or more on-board sensors that may be responsive to particular environments and/or capable of detecting a change in particular environments. For example, a mobile device may comprise one or more ambient environment sensors, such as barometric pressure sensors, temperature sensors, microphones, ambient light sensors, camera sensors, etc., one or more inertial sensors, such as accelerometers, gyroscopes, magnetometers, pedometers, etc., or any combination thereof. A multi-level structure may typically comprise a number of features, such as, for example, stairs, elevators, escalators, or the like, such as to allow a user of a co-located mobile device to travel between various associated levels. At times, these transitions between levels may, for example, be accompanied by changes in environmental conditions that may be detected via one or more sensors disposed on the mobile device.

For example, at times, a change in an environmental condition may comprise a change in a barometric pressure and/or altitude, which may be detected, at least in part, via barometric pressure measurements taken by an on-board barometric pressure sensor, such as within a particular measurement time window. Namely, in some instances, detecting an incremental decrease in measured barometric pressure may, for example, be indicative of an increase in altitude in a transition to a higher level (e.g., a floor, etc.). Likewise, detecting an incremental increase in measured barometric pressure may, for example, be indicative of a decreased altitude in a transition to a lower level. Thus, here, by measuring changes in barometric pressure rather than computing absolute altitude, one or more challenges, such as regarding a continual sensor calibration in light of time-varying air temperature, density, etc. discussed above may, for example be advantageously addressed and/or resolved. By way of example but not limitation, in one particular simulation or experiment, it appeared that a measurement time window in a range between 5.0 seconds and 5.0 minutes may prove beneficial for a detection of a transition between floors of a typical building, such as via stairs, escalators, and/or elevators. Claimed subject matter is not so limited, of course.

In some instances, one or more changes in measured barometric pressure indicative of a transition to a higher or lower level (e.g., a floor of a building, etc.) may, for example, be corroborated or contradicted by one or more measurements obtained from one or more other sensors. For example, at times, a change in a measured barometric pressure may be correlated with one or more accelerometer measurements. Here, one or more measurements of acceleration of a mobile device may, for example, be sampled across three accelerometer axes (e.g., for a three-dimensional accelerometer, etc.), and a variance of each axis across some observation time period, such as a measurement time window discussed above, for example, may be computed using one or more appropriate techniques. The sum of the variances across accelerometer axes may, for example, represent a measured level of acceleration experienced by a mobile device during an observation time period. If a measured level of acceleration of a mobile device over a particular measurement time window corresponds with a detected change in a measured barometric pressure, it may, for example, be determined and/or corroborated that a transition has occurred. Otherwise, such as if barometric pressure sensor and accelerometer readings are somewhat contradictory (e.g., there is a change in a measured barometric pressure, but the sum of variances is less than some pre-defined acceleration threshold, etc.), it may be determined or inferred that no transition has occurred. The same or similar approach may, for example, be implemented with respect to one or more other sensors and/or combination of sensors, such as in a like fashion and/or without deviating from the scope of claimed subject matter. In some instances, a transition may, for example, be detected via a single sensor, such as an accelerometer (or some other sensor, e.g., pedometer, etc.), such as without corroboration or contradiction from other sensor(s).

In some instances, a particular level within a multi-level structure may, for example, be determined, initially or otherwise, based, at least in part, on a GNSS position fix, such as current or previously obtained. For example, at times, a GNSS position fix obtained just prior to entering a multi-level structure may indicate that an associated user may be located on a main floor. A mobile device may also apply inertial sensor measurements, for example, to dead reckon from a last know GNSS position fix (e.g., from a last position fix obtained in an outdoor area prior to entering an indoor area, etc.), such as using appropriate techniques. Also, a particular level within a multi-level structure may, for example, be determined based, at least in part, on user input, such as via an appropriate floor selection at a user interface and/or display of an associated mobile device (e.g., via a crowdsourcing application, etc.). At times, a particular level within a multi-level structure may also be determined, for example, based, at least in part, on coordinates that may be transmitted by one or more wireless transmitters positioned at known fixed locations, such as if programmed with specific instructions. In addition, a particular level within a multi-level structure may also be determined using one or more known levels within an adjacent structure as references, for example. Of course, claimed subject matter is not so limited. Any suitable techniques or combination of techniques may be used, in whole or in part, to determine a particular level within a multi-level structure, initially or otherwise. At times, a determined level within a multi-level structure may, for example, be included in one or more messages to a suitable server, which may use the determined level to generate or construct a virtual stack corresponding to a particular physical multi-level structure, such as a multi-story building in which observations were obtained, as discussed below.

By way of another example, in at least one implementation, a transition of a location of a mobile device between levels of a structure, such as floors of a building, for example, may be detected via a change in scenery, such as by a camera sensor disposed on a mobile device. For example, here, one or more computer vision algorithms or approaches, such as coupled with recognition of one or more floor indicators in a field of view of associated camera sensor may be used, in whole or in part. In some instances, a mobile device may, for example, decode applicable floor information encoded via Visible Light Communications techniques or approaches, such as with respect to a particular floor visible to the mobile device's camera and/or ambient light sensor, for example.

With regard to operation 204, observations of wireless signals may, for example, be obtained, at least in part, in response to detecting the transition between the levels of the structure. Here, having detected a transition, such as over an applicable measurement time window, for example, while traveling within an area of interest and maintaining the same vertical state (e.g., staying on the same floor, etc.), a mobile device may, for example, implement one or more crowdsourcing operations and/or techniques. For example, a mobile device may observe wireless signals from one or more proximate or "visible" wireless transmitters, such as one or more serving and/or neighbor cellular base stations, WLAN access points, Bluetooth® beacons, etc., or any combination thereof. As was indicated, mobile device may, for example, decode particular parameters and/or attributes encoded in observed wireless signals using one or more appropriate techniques. In some instances, parameters and/or attributes may comprise, for example, locations, identities (e.g., Cell IDs, MAC addresses, BSS IDs, etc.), etc. of observed wireless transmitters, as well as received signal strength, round trip time, or like characteristics and/or aspects of acquired wireless signals.

As a way of illustration, in some instances, a mobile device may, for example, group applicable characteristics and/or aspects of acquired wireless signals, such as locations, identities of observed wireless transmitters, barometric pressure measurements, etc., such as obtained prior to and after a detected transition over respective measurement time windows, for example, into one or more observation sets as:

Observation Set $(t_1)=(AP_1, AP_2, \ldots AP_i; Cell_a, Cell_b, \ldots Cell_j; Pos_\alpha; Baro_\Phi;)$ at time $t_1$
Potential floor transition (e.g., crowdsourcing trigger)
Observation Set $(t_2)=(AP_2, AP_j, \ldots AP_m; Cell_b, Cell_c, \ldots Cell_k; Pos_\beta; Baro_\Gamma;)$ at time $t_2$
Observation Set $(t_3)=(AP_2, AP_j, \ldots AP_m; Cell_b, Cell_c, \ldots Cell_k; Pos_\beta; Baro_\Gamma;)$ at time $t_3$ As was indicated, wireless signals may, for example, be observed, grouped, processed, etc. in connection with a suitable host crowdsourcing application, which may be provided to a user's mobile device by a suitable server, stored locally on a mobile device, etc. A crowdsourcing application may, for example, be activated, launched, etc. upon a detection of a transition, such as in connection with operation 202, just to illustrate one possible implementation. In some instances, a crowdsourcing application may, for example, be activated, launched, etc. upon user's entering an area of interest (e.g., a building, a particular floor, etc.), upon request, user input, or the like. For the above example, a crowdsourcing application running on a mobile device may, for example, group Observation Sets at times t1 and t2 together with a potential floor transition, such as, for example, for transmitting to a server via one or more messages since these sets may be considered useful due, at least in part, to a detected transition, as discussed below. Further, in some instances, a mobile device may, for example, refrain from crowdsourcing and/or transmitting characteristics and/or aspects of acquired wireless signals, such as for Observation Sets at times t2 and t3, for example, since these sets may be considered less useful due, at least in part, to lack of a detected transition. Of course, details relating to particular observations sets are provided as merely examples to which claimed subject matter is not limited.

Continuing with the above discussion, one or more observations obtained within a multi-level structure may, for example, be accumulated (e.g., in a temporary buffer, etc.) and/or stored (e.g., in a suitable memory, etc.) on a mobile device, such as via a crowdsourcing application running in the background, just to illustrate one possible implementation. As discussed above, at times, observations obtained at a particular level of a multi-level structure, however, may not necessarily be indicative of a wireless transmitter located on that level. For example, as was also indicated, emitted wireless signals may oscillate and/or propagate between adjacent levels (e.g., floors of a building, etc.) and, as such, may be indicative of wireless transmitters located on any one of multiple levels. Thus, in some instances, it may be useful to resolve this uncertainty, such as via implementing a crowdsourcing operation and/or technique that may include performing a reliability assessment with respect to one or more accumulated and/or stored observations. For example, one or more accumulated and/or stored observations may be processed in some manner (e.g., prior to transmitting to a server, etc.) so as to determine whether observed wireless transmitters are associated with the same level as an observing mobile device (e.g., located on the same floor of a building, etc.).

Thus, in at least one implementation, a mobile device may, for example, be capable of determining whether a particular observed wireless transmitter is located on the same level as the mobile device by comparing one or more characteristics of observed wireless signals, such as one or more signal strength measurements with one or more propagation time measurements. For example, here, one or more RSSI and RTT values may be utilized. More specifically, respective RSSI and RTT values for a signal transmitted by a wireless transmitter and received at a receiver of a mobile device may be compared to determine, for example, whether the RSSI and the RTT values are indicative of the same or different ranges or distances to the wireless transmitter, such as using one or more appropriate techniques. Typically, RSSI may be prone to significant degradation during propagation due, at least in part, to encountered obstructions, such as one or more floors of a building, for example, while RTT may be largely unaffected by such obstructions. Thus, utilizing this premise, at least in part, if a range to a wireless transmitter estimated via RSSI is significantly greater than a range estimated via corresponding RTT, for example, it may be determined or inferred that the transmitter and an observing mobile device are on different levels of a multi-level structure. Here, observations obtained from such a transmitter may, for example, be deemed unreliable and, as such, may be omitted (e.g., from transmitting to a server, etc.), removed (e.g., from a buffer, memory, etc.), or otherwise discarded. In turn, more reliable observations from applicable wireless transmitters, such as assessed via a comparison of applicable RSSI and RTT values indicative of the same or similar ranges or distances, for example, may be selected for a transmission to a server, such as discussed below. At times, more reliable observations may, for example, be further processed, such as accumulated, moved, and/or stored in a separate batch of observations of acquired wireless signals.

In some instances, as part of a crowdsourcing operation and/or technique, a mobile device may, for example, implement a wireless transmitter reliability assessment using a plurality of detected transitions. For example, if a crowdsourcing mobile device continually observes wireless signals from a particular transmitter despite a plurality of detected transitions to a plurality of different levels, such a transmitter may be deemed to be unreliable and, thus, less than useful for multi-level position determination. Accordingly, such a wireless transmitter may, for example, be excluded from a batch, as discussed above. In addition, here, a mobile device may also implement batch processing of one or more observations obtained in connection with a plurality of detected transitions. For example, raw observations may be collected into batches of applicable measurements according to particular transitions and may be referenced to determine or infer another transition. Raw batched measurements may also be fused with barometric sensor measurements corresponding to one or more detected transitions to estimate a height and/or altitude with respect to a multi-level structure or a portion thereof.

At operation 206, one or more messages comprising the obtained observations in association with the detected transition may, for example, be transmitted to a suitable server (e.g., server 116, 118, and/or 120 of FIG. 1). Here, any suitable "push" or "pull" messaging approach or combination of approaches may, for example, be utilized, in whole or in part. For messaging, one or more observations and a corresponding detected transition may, for example, be correlated or associated in connection with any suitable communication protocol and/or process, such as via encoding, modulating, demodulating, decoding, etc. one or more properties of an appropriate wireless signal. These or like techniques are generally known and need not be described here in greater detail. In some instances, a message comprising crowdsourced data (e.g., observations in association with a detected transition, etc.) may, for example, be aggregated and/or stored in some manner, such as in a batch in a suitable local memory or a portion thereof (e.g., a buffer, local cache, etc.), such as prior to transmitting such a batch to a server. Optionally or alternatively, crowdsourced data may, for example, be transmitted to a server in real or near real time, such as at or upon obtaining one or more applicable observations of wireless signals, responsive to detecting a transition between levels of a multi-level structure, etc., or any combination thereof. In this context, "real time" refers to an amount of timeliness of data, which may have been delayed by, for example, an amount of time attributable to electronic communication and/or signal processing.

Thus, having received one or more messages, a server may, for example, process crowdsourced data and may use the data, at least in part, to assist mobile devices in multi-level positioning, such as, for example, positioning within a multi-level structure, such as a multi-story building. For example, a server may process crowdsourced data and may construct and/or update a suitable database of expected signal signatures, such as a radio heat map, as one example, with respect to a multi-level structure and/or particular levels of a structure and may provide the database to mobile devices of interest. A server may, for example, use crowdsourced data to identify and/or group wireless transmitters that are more likely to be located on the same level, such as by correlating identifiers of observed wireless transmitters (e.g., Cell IDs, MAC addresses, BSS IDs, etc.) that have the same or similar aspects and/or characteristics at corresponding transitions. A server may further refine these groupings by eliminating one or more wireless transmitters with ambiguous observations, such as by performing a suitable reliability assessment. For example, a server may discard data related to wireless transmitters that are/were observable at multiple levels of a structure despite numerous detected transitions, as discussed above. A server may also perform a reliability assessment of wireless transmitters using single-floor association or like statistics. For example, if a sufficiently large or otherwise statistically significant number of crowdsourcing mobile devices transmit similar groupings of observed wireless transmitters from a particular level, these observations (as well as associated wireless transmitters) may be deemed more reliable with respect to that level.

In some instances, instead of computing absolute altitude and/or height, a server may derive one or more height differences or "deltas" that correspond to one or more detected transitions so as to determine or infer a separation of physical vertical levels (e.g., floors, etc.) in a multi-level structure, such as using one or more appropriate techniques. For example, using crowdsourced data, a server may detect that a plurality of mobile devices tend to make the same or similar vertical transitions in a multi-level structure, and that each of these transitions is quantized via the same or similar height (e.g., almost always 5.0 meters, almost always 3.0 meters, etc.). As such, here, a server may determine or infer that such transitions may be attributable to user movements between different levels of a structure, which may correspond to or correlate with heights of these levels. Thus, each transition and/or its height, such as with respect to a specific location within a particular multi-level structure, for example, may be noted and/or recorded accordingly. If there is a trend and/or consistency in delta height readings (e.g., via barometric sensor outputs, etc.) received from a plurality of crowdsourcing mobile devices, this trend and/or consistency may, for example, indicate that detected transitions may be attributable, such as with sufficient certainty, to user movements between levels of a multi-level structure.

As a way of illustration, at times, a reliability assessment may, for example, be implemented using sets of observations and/or correlating sets of observations obtained from one or more crowdsourcing mobile devices. For example, using the example of the above-referenced observation sets, consider:

Observation Set $(t_1)=(AP_1, AP_2, \ldots AP_i; Cell_a, Cell_b, \ldots Cell_j; Pos_\alpha; Baro_\Phi;)$ at time $t_1$ Potential floor transition (crowdsourcing trigger)

Observation Set $(t_2)=(AP_2, AP_j, \ldots AP_m; Cell_b, Cell_c, \ldots Cell_k; Pos_\beta; Baro_\Gamma;)$ at time $t_2$ As seen, here, since access point $AP_2$ and cells $Cell_b, Cell_c$ are observed both before and after a potential floor transition (e.g., from Floor X to Floor Y, etc.), data related to these transmitters may be considered less than useful because these transmitters may be located on any of these floors (e.g., Floor X, Floor Y, etc.), as discussed above. As such, data related to these wireless transmitters may, for example, be ignored. Data obtained with respect to transmitters ($AP_1$, $AP_i$, $Cell_j$) and ($AP_j$, $AP_m$, $Cell_k$), however, may be considered more useful since these transmitters are uniquely observed with respect to a particular floor. Further, if such observations (e.g., Observation Sets at t1 and t2, etc.) are obtained from a plurality of other mobile devices crowdsourcing within a particular multi-level structure, then a server may be able to determine, such as with sufficient confidence (e.g., by computing a confidence score, etc.), for example, that certain transmitters (e.g., in Observation Sets at t1 and t2, etc.) are reliably associated with particular floors. In addition, deltas for barometric pressure measurements (e.g., $Baro_\Gamma$-$Baro_\Phi$) over a relatively short time period may, for example, be indicative of floor-related height changes, such as discussed above. As such, here, a server may also be able to determine, such as with sufficient confidence (e.g., by computing a confidence score, etc.), for example, that certain wireless transmitters (e.g., $AP_1$, $AP_i$, $Cell_j$) are positioned above (or below) other wireless transmitters (e.g., $AP_j$, $AP_m$, $Cell_k$), and may also determine a vertical distance between applicable wireless transmitters. For example, if measurement indicate that Floor Y is 8.0 meters above Floor X, and that Floor X is 5.0 meters above Floor W, a reasonable inference or determination may be made (e.g., by a server, etc.) that Floor Y is about 3.0 meters above Floor W. As another example, if Floor M is 3.5 meters above Floor K (e.g., as crowdsourced by a single mobile device), and Floor N is 3.2 meters above Floor K (e.g., as crowdsourced by another mobile device), a server may try to resolve or determine (e.g., via suitable processes, etc.) whether Floor M and N are in effect the same floor. Of course, these are merely details relating to specific floor separations, and claimed subject matter is not so limited.

In an implementation, based, at least in part, on crowdsourced data, a server may construct or generate a model of virtual levels or so-called "virtual stack" corresponding to a particular physical multi-level structure, such as a multi-story building in which observations were obtained. As used herein, "virtual stack" refers to an established order of vertical relationships and/or heights of associated virtual levels represented via level-based groupings of wireless transmitters (e.g., access points, etc. stacked upon each other). A virtual stack may comprise, for example, one or more virtual levels associated with observations of wireless signals grouped with respect to a particular level and may include any suitable numbering of such virtual levels (e.g., floors 1 through 10, level A through Z, etc.), which may correspond to physical levels of a corresponding structure. Claimed subject matter is not so limited, of course. For example, in some instances, levels of a virtual stack may not correspond to physical levels of a structure, but to some floor and/or height marker, virtual or otherwise. A server may construct or generate a virtual stack in any suitable increments, such as, for example, via observations received from crowdsourcing mobile devices with respect to any suitable portion of a multi-level structure at any suitable time, and incorporating or combining the received observations representing various portions of the structure into the stack.

As was indicated, a virtual stack may be provided as part of positioning assistance data and may help in determining a vertical relationship of a mobile device's user to a party of interest (e.g., a first responder, etc.) in a multi-level structure without the need for precise floor determination. For example, a mobile device of a first responder may communicate with a suitable server and may be provided a virtual stack for an applicable multi-level structure. While on a particular level of a structure, a mobile device of a first responder may observe associated wireless signals (e.g., RSSI, RTT, MAC addresses, etc.) and, based, at least in part, on a provided virtual stack, may, for example, compare the observed signals with signals expected to be observed on that particular level, such as determined via the stack. Based, at least in part, on such comparison, a mobile device of a first responder may determine its vertical position within a provided virtual stack, such as without actual physical floor determination. A mobile device of a first responder may then communicate its vertical position in a virtual stack to a server, for example, which may also make similar determinations with respect to a mobile device to be located. A server may then provide a location of a mobile device to be located to a first responder in terms of their vertical relationship, such as using virtual level ordering and/or separation (e.g., three levels above you, two levels below you, etc.). As such, a particular mobile device may be more effectively and/or more efficiently located, such as without determining actual floors of a building or like multi-level structure. Claimed subject matter is not so limited, of course. For example, all or part of determinations mentioned above may be implemented on a server, mobile device, or any combination thereof.

In some instances, crowdsourced data may also be used, at least in part, for associating a virtual level of a stack with a particular physical level of a corresponding multi-level structure, as was also indicated. For example, at times, a mobile device may be capable of obtaining a reliable estimate of its location on a particular level (e.g., X, Y, Z coordinates, etc.) either prior to or following a detected transition between levels of a structure. A mobile device may, for example, obtain a more reliable estimate of its location from a GNSS position fix immediately preceding entry to a lobby of a building (e.g., located on a first or lobby floor, etc.). By progressively referencing to this more reliable estimate, a mobile device may, for example, determine one or more other levels from one or more subsequent transitions. Likewise, obtaining a more reliable estimate of its location following a detection of a latest transition to a destination level, a mobile device may, for example, determine a more reliable estimate of its location at the destination level (and destination levels of previous contiguous detections of transitions between levels). In some instances, a mobile device may, for example, include these more reliable estimates of its location (e.g., along with corresponding observations, etc.) in one or more messages transmitted to a server, as discussed above. Based, at least in part on these more reliable estimates, a server may, for example, be capable of correlating or associating physical levels of a multi-level structure with virtual levels of a corresponding virtual stack and may update the stack with actual floor numbers.

Thus, one or more operations and/or techniques for selective crowdsourcing for multi-level positioning, such as positioning in a multi-level structure, for example, may provide advantages. For example, as discussed above, by measuring changes in barometric pressure rather than computing absolute altitude, a continual sensor calibration in light of time-varying air temperature, density, etc. may not be needed or otherwise useful. Also, by processing observations, such as prior to a transmission to a server, for example, more reliable data may be obtained and/or used, as was also indicated. In addition, by selectively (e.g., rather than indiscriminately, continually, etc.) crowdsourcing data, improved efficiency crowdsourcing in a multi-level structure may, for example, be achieved. For example, selective crowdsourcing may help in more effectively and/or more efficiently constructing and/or updating a database of wireless transmitters (e.g., a radio heat map, etc.) for an area of interest, such as by selecting data that may be more useful for positioning. Selective crowdsourcing may also provide a better crowdsourcing user experience, such as by not wasting battery life, memory space, etc. of a mobile device, or the like.

Figure 3:
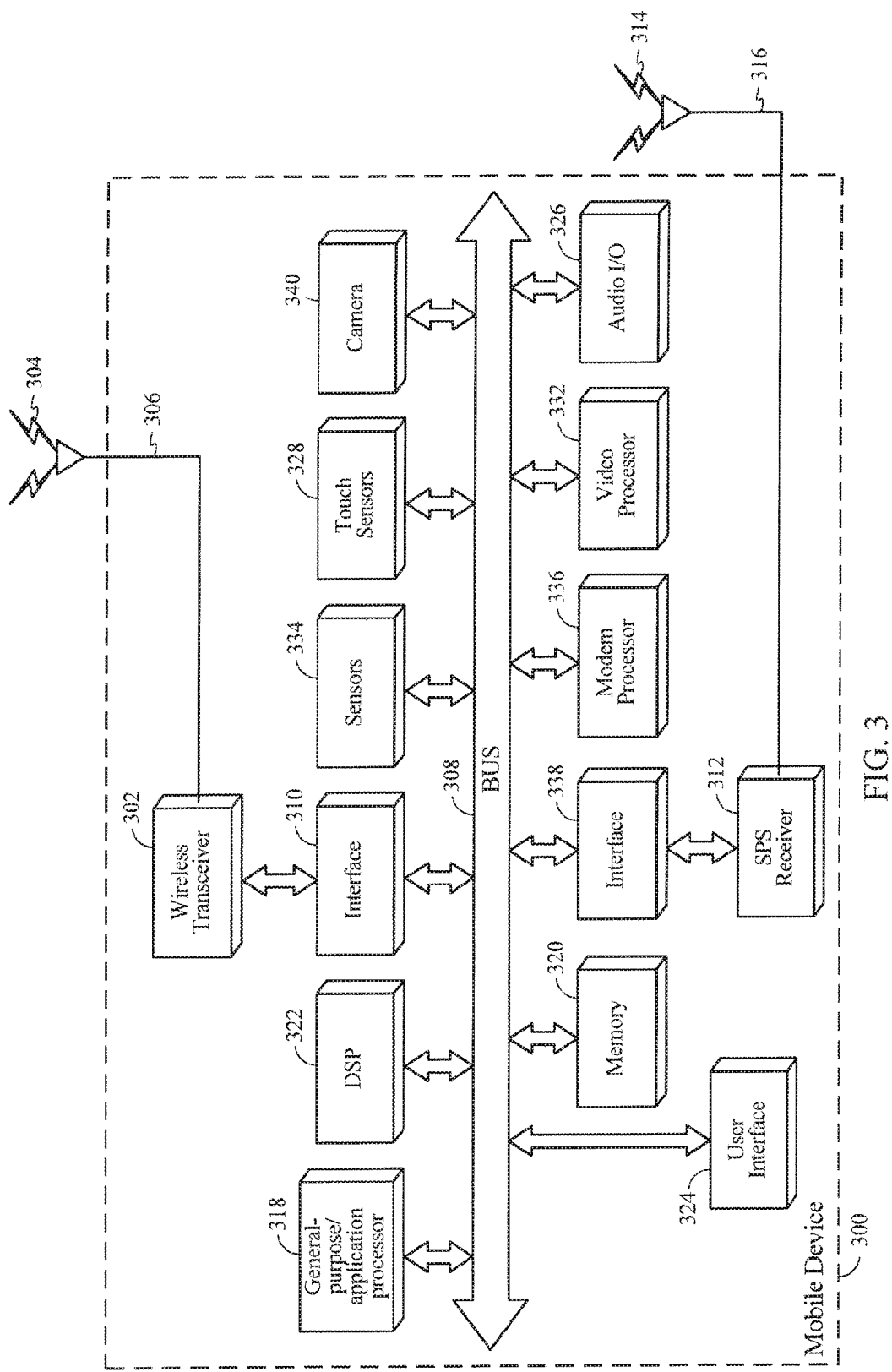
FIG. 3 is a schematic diagram illustrating an implementation of an example computing environment associated with a mobile device.

FIG. 3 is a schematic diagram of an implementation of an example computing environment associated with a mobile device that may be used, at least in part, to facilitate or support one or more operations and/or processes for selective crowdsourcing for multi-level positioning. An example computing environment may comprise, for example, a mobile device 300 that may include one or more features or aspects of mobile device 102 of FIG. 1, though claimed subject matter is not so limited. For example, in some instances, mobile device 300 may comprise a wireless transceiver 302 capable of transmitting or receiving wireless signals, referenced generally at 304, such as via an antenna 306 over a suitable wireless communications network. Wireless transceiver 302 may, for example, be capable of sending or receiving one or more suitable communications, such as one or more communications discussed with reference to FIGS. 1-2. Wireless transceiver 302 may, for example, be coupled or connected to a bus 308 via a wireless transceiver bus interface 310. Depending on an implementation, at times, wireless transceiver bus interface 310 may, for example, be at least partially integrated with wireless transceiver 302. Some implementations may include multiple wireless transceivers 302 or antennas 306 so as to enable transmitting or receiving signals according to a corresponding multiple wireless communication standards such as Wireless Local Area Network (WLAN) or Wi-Fi, Code Division Multiple Access (CDMA), Wideband-CDMA (W-CDMA), Long Term Evolution (LTE), Bluetooth®, just to name a few examples.

In an implementation, mobile device 300 may, for example, comprise an SPS or like receiver 312 capable of receiving or acquiring one or more SPS or other suitable wireless signals 314, such as via an SPS or like antenna 316. SPS receiver 312 may process, in whole or in part, one or more acquired SPS signals 314 for determining a location of mobile device 300. In some instances, one or more general-purpose application processors 318 (henceforth referred to as "processor"), memory 320, digital signal processor(s) (DSP) 322, or like specialized devices or processors not shown may be utilized to process acquired SPS signals 314, in whole or in part, calculate a location of mobile device 300, such as in conjunction with SPS receiver 312, or the like. Storage of SPS or other signals for implementing one or more positioning operations, such as in connection with one or more techniques for selective crowdsourcing for multi-level positioning, for example, may be performed, at least in part, in memory 320, suitable registers or buffers (not shown). Although not shown, it should be appreciated that in at least one implementation one or more processors 318, memory 320, DSPs 322, or like specialized devices or processors may comprise one or more processing modules capable of detecting a transition of a location of mobile device 300 between levels of a structure based, at least in part, on a change in an environmental condition detected via one or more sensors disposed on mobile device 300; obtaining observations of wireless signals responsive to detecting the transition between the levels of the structure; and transmitting one or more messages to a server comprising the obtained observations in association with the detected transition.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 318 or DSP 322 may include one or more processors, controllers, microprocessors, microcontrollers, application specific integrated circuits, digital signal processors, programmable logic devices, field programmable gate arrays, or the like, or any combination thereof. Thus, at times, processor 318 or DSP 322 or any combination thereof may comprise or be representative of means for detecting a transition of a location of mobile device 300 between levels of a structure based, at least in part, on a change in an environmental condition detected via one or more sensors disposed on mobile device 300, such as to implement operation 202 of FIG. 2, at least in part. In addition, in at least one implementation, processor 318 or DSP 322 may be representative of or comprise, for example, means for obtaining observations of wireless signals responsive to detecting the transition between the levels of the structure, such as to implement operation 204 of FIG. 2, at least in part. In some instances, processor 318 or DSP 322 or any combination thereof may comprise or be representative of means for transmitting one or more messages to a server comprising the obtained observations in association with the detected transition, such as to implement operation 206 of FIG. 2, at least in part.

As illustrated, DSP 322 may be coupled or connected to processor 318 and memory 320 via bus 308. Although not shown, in some instances, bus 308 may comprise one or more bus interfaces that may be integrated with one or more applicable components of mobile device 300, such as DSP 322, processor 318, memory 320, or the like. In various embodiments, one or more operations or functions described herein may be performed in response to execution of one or more machine-readable instructions stored in memory 320, such as on a computer-readable storage medium, such as RAM, ROM, FLASH, disc drive, etc., just to name a few examples. Instructions may, for example, be executable via processor 318, one or more specialized processors not shown, DSP 322, or the like. Memory 320 may comprise a non-transitory processor-readable memory, computer-readable memory, etc. that may store software code (e.g., programming code, instructions, etc.) that may be executable by processor 318, DSP 322, or the like to perform operations or functions described herein.

Mobile device 300 may comprise a user interface 324, which may include any one of several devices such as, for example, a speaker, microphone, display device, vibration device, keyboard, touch screen, etc., just to name a few examples. In at least one implementation, user interface 324 may enable a user to interact with one or more applications hosted on mobile device 300. For example, one or more devices of user interface 324 may store analog or digital signals on memory 320 to be further processed by DSP 322, processor 318, etc. in response to input or action from a user. Similarly, one or more applications hosted on mobile device 300 may store analog or digital signals in memory 320 to present an output signal to a user. In some implementations, mobile device 300 may optionally include a dedicated audio input/output (I/O) device 326 comprising, for example, a dedicated speaker, microphone, digital to analog circuitry, analog to digital circuitry, amplifiers, gain control, or the like. It should be understood, however, that this is merely an example of how audio I/O device 326 may be implemented, and that claimed subject matter is not limited in this respect. As seen, mobile device 300 may comprise one or more touch sensors 328 responsive to touching or like pressure applied on a keyboard, touch screen, or the like.

In an implementation, mobile device 300 may comprise, for example, a camera 340, dedicated or otherwise, such as for capturing still or moving imagery, or the like. Camera 340 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 318, DSP 322, or the like. Optionally or alternatively, a video processor 332, dedicated or otherwise, may perform conditioning, encoding, compression, or manipulation of signals representing one or more captured images. Additionally, video processor 332 may, for example, decode or decompress one or more stored images for presentation on a display (not shown) of mobile device 300.

Mobile device 300 may comprise one or more sensors 334 coupled or connected to bus 308, such as, for example, one or more inertial sensors, environment sensors, or the like. Inertial sensors of sensors 334 may comprise, for example, one or more accelerometers (e.g., collectively responding to acceleration of mobile device 300 in one, two, or three dimensions, etc.), gyroscopes or magnetometers (e.g., to support one or more compass or like applications, etc.), etc., just to illustrate a few examples. Ambient environment sensors of mobile device 300 may comprise, for example, one or more barometric pressure sensors, temperature sensors, ambient light detectors, camera sensors, microphones, etc., just to name few examples. Sensors 334 may generate analog or digital signals that may be stored in memory 320 and may be processed by DSP 322, processor 318, etc., such as in support of one or more applications directed to positioning or navigation operations, wireless communications, radio heat map construction and/or updating, video gaming or the like.

In a particular implementation, mobile device 300 may comprise, for example, a modem processor 336, dedicated or otherwise, capable of performing baseband processing of signals received or downconverted via wireless transceiver 302, SPS receiver 312, or the like. Similarly, modem processor 336 may perform baseband processing of signals to be upconverted for transmission via wireless transceiver 302, for example. In alternative implementations, instead of having a dedicated modem processor, baseband processing may be performed, at least in part, by processor 318, DSP 322, or the like. In addition, in some instances, an interface 338, although illustrated as a separate component, may be integrated, in whole or in part, with one or more applicable components of mobile device 300, such as bus 308 or SPS receiver 312, for example. Optionally or alternatively, SPS receiver 312 may be coupled or connected to bus 308 directly. It should be understood, however, that these are merely examples of components or structures that may perform baseband processing, and that claimed subject matter is not limited in this regard.

Figure 4:
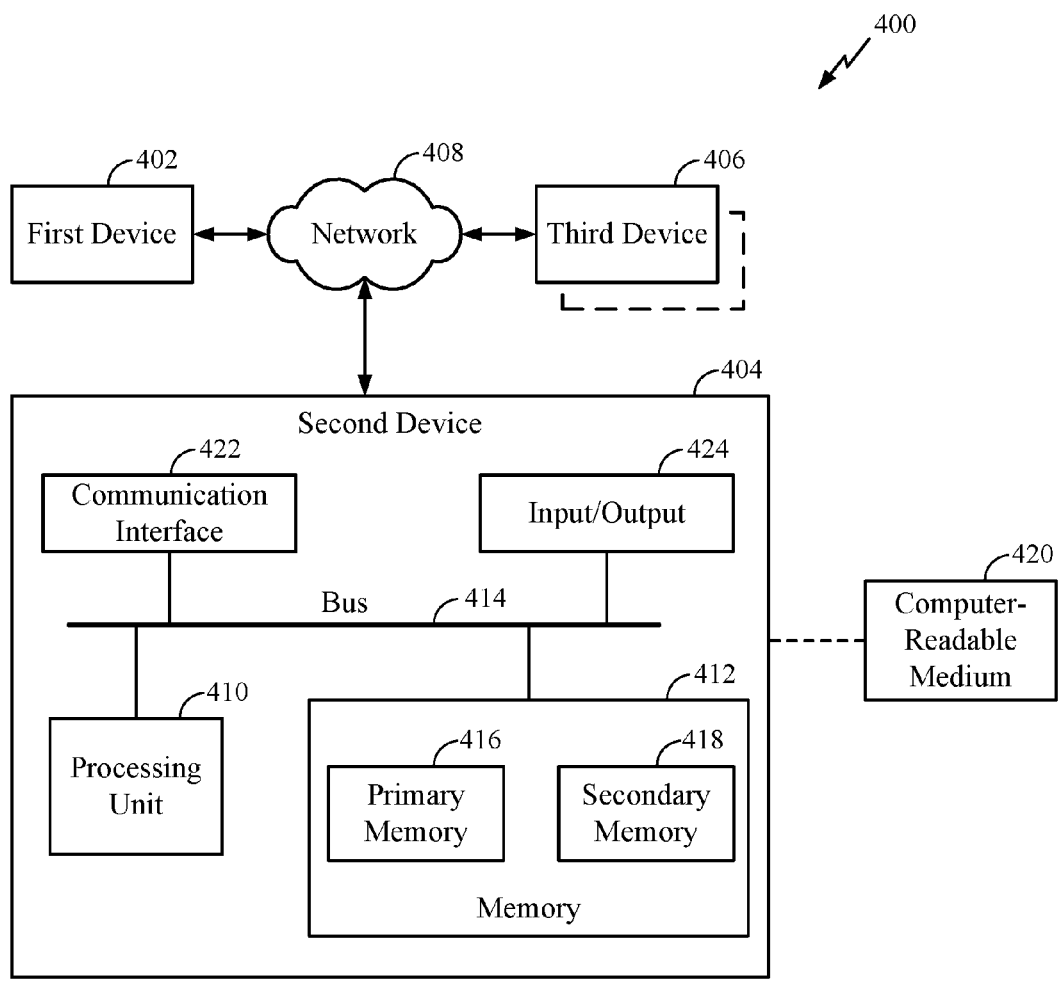
FIG. 4 is a schematic diagram illustrating an implementation of an example computing environment associated with a server.

FIG. 4 is a schematic diagram illustrating an implementation of an example computing environment or system 400 that may be associated with or include one or more servers or other devices capable of partially or substantially implementing and/or supporting one or more operations and/or processes for selective crowdsourcing for multi-level positioning, such as discussed above in connection with FIGS. 1-2, for example. Computing environment 400 may include, for example, a first device 402, a second device 404, a third device 406, etc., which may be operatively coupled together via a communications network 408. In some instances, first device 402 may comprise a server capable of providing positioning assistance data, such as, for example, identities, locations, etc. of known wireless transmitters, radio heat map, base station almanac, electronic digital map, database of wireless transmitters, bias estimates, signal measurements, virtual stack, or the like. For example, first device 402 may also comprise a server capable of providing an electronic digital map to a mobile device based, at least in part, on a coarse or rough estimate of a location of the mobile device, upon request, or the like. First device 402 may also comprise a server capable of providing any other suitable positioning assistance parameters (e.g., an electronic digital map, radio heat map, etc.), relevant to a location of a mobile device. Second device 404 or third device 406 may comprise, for example, mobile devices, though claimed subject matter is not so limited. For example, in some instances, second device 404 may comprise a server functionally or structurally similar to first device 402, just to illustrate another possible implementation. In addition, communications network 408 may comprise, for example, one or more wireless transmitters, such as access points, femtocells, or the like. Of course, claimed subject matter is not limited in scope in these respects.

First device 402, second device 404, or third device 406 may be representative of any device, appliance, platform, or machine that may be capable of exchanging parameters and/or information over communications network 408. By way of example but not limitation, any of first device 402, second device 404, or third device 406 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 402, 404, and 406, respectively, may comprise one or more of a mobile device, wireless transmitter or receiver, server, etc. in accordance with example implementations described herein.

In an implementation, communications network 408 may be representative of one or more communication links, processes, or resources capable of supporting an exchange of information between at least two of first device 402, second device 404, or third device 406. By way of example but not limitation, communications network 408 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 406, there may be additional like devices operatively coupled to communications network

408. It is also recognized that all or part of various devices or networks shown in computing environment 400, or processes or methods, as described herein, may be implemented using or otherwise including hardware, firmware, software, or any combination thereof.

By way of example but not limitation, second device 404 may include at least one processing unit 410 that may be operatively coupled to a memory 412 via a bus 414. Processing unit 410 may be representative of one or more circuits capable of performing at least a portion of a suitable computing procedure or process. For example, processing unit 410 may include one or more processors, controllers, microprocessors, microcontrollers, application specific integrated circuits, digital signal processors, programmable logic devices, field programmable gate arrays, or the like, or any combination thereof. Although not shown, second device 404 may include a location-tracking unit that may initiate a position fix of a suitable mobile device, such as in an area of interest, for example, based, at least in part, on one or more received or acquired wireless signals, such as from an SPS, one or more Wi-Fi access points, etc. In some implementations, a location-tracking unit may be at least partially integrated with a suitable processing unit, such as processing unit 410, for example, though claimed subject matter is not so limited. In certain server-based or server-supported implementations, processing unit 410 may, for example, comprise means for detecting a transition of a location of a mobile device between levels of a structure based, at least in part, on a change in an environmental condition detected via one or more sensors disposed on the mobile device, such as to facilitate and/or support operations 202, 204, and/or 206 of FIG. 2, at least in part. In some instances, processing unit 410 may, for example, comprise means for obtaining observations of wireless signals responsive to detecting the transition between the levels of the structure, such as to facilitate and/or support operations 202, 204, and/or 206 of FIG. 2, at least in part. At times, processing unit 410 may, for example, comprise means for transmitting one or more messages to a server comprising the obtained observations in association with the detected transition, such as to facilitate and/or support operations 202, 204, and/or 206 of FIG. 2, at least in part.

Memory 412 may be representative of any information storage mechanism or appliance. Memory 412 may include, for example, a primary memory 416 and a secondary memory 418. Primary memory 416 may include, for example, a random access memory, read only memory, etc. While illustrated in this example as being separate from processing unit 410, it should be understood that all or part of primary memory 416 may be provided within or otherwise co-located/coupled with processing unit 410. Secondary memory 418 may include, for example, same or similar type of memory as primary memory or one or more information storage devices or systems, such as, for example, a disk drive, an optical disc drive, a tape drive, a solid state memory drive, etc. In certain implementations, secondary memory 418 may be operatively receptive of, or otherwise configurable to couple to, a computer-readable medium 420. Computer-readable medium 420 may include, for example, any non-transitory storage medium that may carry or make accessible information, code, or instructions for one or more of devices in computing environment 400. Computer-readable medium 420 may also be referred to as a machine-readable medium, storage medium, or the like.

Second device 404 may include, for example, a communication interface 422 that may provide for or otherwise support an operative coupling of second device 404 to at least communications network 408. By way of example but not limitation, communication interface 422 may include a network interface device or card, a modem, a router, a switch, a transceiver, and the like. Second device 404 may also include, for example, an input/output device 424. Input/output device 424 may be representative of one or more devices or features that may be configurable to accept or otherwise introduce human or machine inputs, or one or more devices or features that may be capable of delivering or otherwise providing for human or machine outputs. By way of example but not limitation, input/output device 424 may include an operatively configured display, speaker, keyboard, mouse, trackball, touch screen, information port, or the like.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, messages, parameters, frames, packets, content and/or the like. It should be understood, however, that all of these and/or similar terms are to be associated with appropriate physical quantities or manifestations, and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. Likewise, operation of a memory device to store bits, values, elements, symbols, characters, terms, numbers, numerals, measurements, messages, parameters, frames, packets, content and/or the like may comprise a physical transformation. With particular types of memory devices, such a physical transformation may comprise a physical transformation of an article to a different state or thing. For example, but without limitation, for some types of memory devices, a change in state may involve an accumulation and/or storage of charge or a re-lease of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") net-work, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell and/or picocell, utilized to extend cellular telephone service into a business or home. In such an implementation, one or more mobile devices may communicate with a femtocell and/or picocell via a code division multiple access ("CDMA") cellular communication protocol, for example, and the femtocell and/or picocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that transmits a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
   detecting a transition of a location of the mobile device between levels of a structure based, at least in part, on a change in an environmental condition detected via one or more sensors disposed on the mobile device;
   obtaining observations of wireless signals responsive to detecting the transition between the levels of the structure, wherein the obtaining the observations of wireless signals includes performing a batch processing of the obtained observations to be included in one or more messages;
   performing a reliability assessment with respect to the obtained observations;
   selecting the obtained observations for inclusion in one or more measurement batches in combination with observations of wireless signals obtained prior to the detected transition based, at least in part, on the reliability assessment; and
   transmitting the one or more messages to a server comprising the combined batched observations in association with the detected transition.

2. The method of claim 1, wherein the obtained observations comprise at least one of the following: identifiers of wireless transmitters; characteristics of the wireless signals; or any combination thereof.

3. The method of claim 1, wherein the one or more sensors disposed on the mobile device comprise at least one of the following: one or more inertial sensors; one or more environment sensors; or any combination thereof.

4. The method of claim 1, wherein the change in the environmental condition comprises at least one of the following: a change in a barometric pressure; a change in altitude; a change in acceleration; a change in scenery; or any combination thereof.

5. The method of claim 1, and further comprising:
   obtaining a position fix via at least one of the following: Global Navigation Satellite System (GNSS) positioning; wireless local area network (WLAN) positioning; computer vision-based positioning; visible light communications (VLC) positioning; or any combination thereof;
   determining a particular level of the levels based, at least in part, on the obtained position fix; and
   including the determined particular level of the levels in the one or more messages.

6. The method of claim 1, wherein the levels of the structure comprise floors of a building.

7. The method of claim 1, wherein the reliability assessment is based, at least in part, on a comparison of a signal strength measurement with a propagation time measurement.

8. The method of claim 1, and further comprising excluding at least one of the obtained observations from the one or more messages based, at least in part, on the reliability assessment.

9. The method of claim 1, wherein the one or more messages are transmitted for creating a virtual stack or a portion thereof corresponding to the levels of the structure.

10. The method of claim 1, wherein the observations of wireless signals are obtained from at least one of the following: a WLAN access point; a wireless local area network (WWAN) access point; a femtocell; a picocell; a wireless transmitter; or any combination thereof.

11. The method of claim 1, wherein the change in the environmental condition is detected over a measurement time window.

12. The method of claim 11, wherein the measurement time window comprises a time window in a range between approximately 5.0 seconds and 5.0 minutes.

13. The method of claim 1, and further comprising corroborating or contradicting the detecting the transition based, at least in part, on one or more measurements from the one or more sensors.

14. The method of claim 1, wherein the one or more messages further comprise a particular level of the levels determined based, at least in part, on at least one of the following: a user input; a known location of a wireless transmitter; dead reckoning; or any combination thereof.

15. An apparatus comprising:
means for detecting a transition of a location of a mobile device between levels of a structure based, at least in part, on a change in an environmental condition detected via one or more sensors disposed on the mobile device;
means for obtaining observations of wireless signals responsive to detecting the transition between the levels of the structure, wherein the means for obtaining the observations of wireless signals include means performing a batch processing of the obtained observations to be included in one or more messages;
means for performing a reliability assessment with respect to the obtained observations;
means for selecting the obtained observations for inclusion in one or more measurement batches in combination with observations of wireless signals obtained prior to the detected transition based, at least in part, on the reliability assessment; and
means for transmitting the one or more messages to a server comprising the combined batched observations in association with the detected transition.

16. The apparatus of claim 15, wherein the change in the environmental condition comprises at least one of the following: a change in a barometric pressure; a change in altitude; a change in acceleration; a change in scenery; or any combination thereof.

17. An apparatus comprising:
one or more processors coupled to a memory, the one or more processors and the memory configured to:
detect a transition of a location of a mobile device between levels of a structure based, at least in part, on a change in an environmental condition detected via one or more sensors disposed on the mobile device; and
a wireless transceiver to communicate with an electronic communications network to:
obtain observations of wireless signals responsive to detecting the transition between the levels of the structure, wherein to obtain the observations of wireless signals includes a performance of a batch processing of the obtained observations to be included in one or more messages;
perform a reliability assessment with respect to the obtained observations;
select the obtained observations for inclusion in one or more measurement batches in combination with observations of wireless signals obtained prior to the detected transition based, at least in part, on the reliability assessment; and
transmit the one or more messages to a server comprising the combined batched observations in association with the detected transition.

18. The apparatus of claim 17, wherein the change in the environmental condition comprises at least one of the following: a change in a barometric pressure; a change in altitude; a change in acceleration; a change in scenery; or any combination thereof.

* * * * *